United States Patent
Amnell et al.

(10) Patent No.: US 10,012,108 B2
(45) Date of Patent: Jul. 3, 2018

(54) GAS TURBINE ENGINE COMPONENT

(75) Inventors: Henrik Amnell, Trollhattan (SE);
Lennart Brottgardh, Trollhattan (SE);
David Russberg, Trollhattan (SE);
Patrik Svantesson, Trollhattan (SE)

(73) Assignee: GKN Aerospace Sweden AB, Trollhattan (SE)

( * ) Notice: Subject to any disclaimer, the term of this patent is extended or adjusted under 35 U.S.C. 154(b) by 602 days.

(21) Appl. No.: 14/366,985

(22) PCT Filed: Dec. 23, 2011

(86) PCT No.: PCT/SE2011/000246
§ 371 (c)(1),
(2), (4) Date: Sep. 10, 2015

(87) PCT Pub. No.: WO2013/095212
PCT Pub. Date: Jun. 27, 2013

(65) Prior Publication Data
US 2016/0003099 A1    Jan. 7, 2016

(51) Int. Cl.
*F01D 25/16* (2006.01)
*F01D 25/24* (2006.01)

(52) U.S. Cl.
CPC ........... *F01D 25/162* (2013.01); *F01D 25/24* (2013.01); *F05D 2230/232* (2013.01); *F05D 2230/60* (2013.01); *Y02T 50/671* (2013.01)

(58) Field of Classification Search
CPC .. F01D 25/162; F01D 25/24; F05D 2230/232; F05D 2230/60; Y02T 50/671
See application file for complete search history.

(56) References Cited

U.S. PATENT DOCUMENTS 5,483,792 A      1/1996   Czachor et al.
9,316,108 B2 *   4/2016   Pegan, Jr. ............... F01D 9/065
(Continued)

FOREIGN PATENT DOCUMENTS

EP    0344877 A1    12/1989
EP    1247944 A2     9/2002
(Continued)

OTHER PUBLICATIONS

PCT International Search Report and Written Opinion (PCT/SE2011/000246) dated Sep. 3, 2012 (12 pages).
(Continued)

*Primary Examiner* — Richard Edgar
(74) *Attorney, Agent, or Firm* — Bejin Bieneman PLC

(57) ABSTRACT

The invention concerns a gas turbine engine component (37) comprising an outer ring structure (10), an inner ring structure (20) and a plurality of circumferentially spaced radial elements (15) for transferring loads between the inner ring structure (20) and the outer ring structure (10), wherein the outer ring structure (10) comprises a circular ring member (11) for withstanding an internal pressure during operation of the gas turbine engine. The invention is characterized in that the outer ring structure (10) comprises a first set of circumferentially distributed and substantially straight reinforcement ribs (16) for achieving radial stiffness, wherein the reinforcement ribs (16) form sides in a polygonal shape and wherein each of said reinforcement ribs (16) extends between two adjacent radial elements (15). The invention also concerns a gas turbine engine (1) comprising a component (37) of the above type.

21 Claims, 5 Drawing Sheets

(56) References Cited

U.S. PATENT DOCUMENTS

| | | |
|---|---|---|
| 2004/0103534 A1 | 6/2004 | Lundgren et al. |
| 2008/0022692 A1 | 1/2008 | Nagendra et al. |
| 2008/0134687 A1 | 6/2008 | Kumar et al. |
| 2009/0101787 A1 | 4/2009 | Dierberger |
| 2011/0000223 A1 | 1/2011 | Russberg |

FOREIGN PATENT DOCUMENTS

| | | |
|---|---|---|
| EP | 1482130 | 12/2004 |
| EP | 1845237 | 10/2007 |
| EP | 1930555 | 6/2008 |
| EP | 2148046 | 1/2010 |
| EP | 2233697 A2 | 9/2010 |
| GB | 918692 A | 2/1963 |
| GB | 2226086 A | 6/1990 |
| GB | 2226600 A | 7/1990 |
| JP | H02-218824 A | 8/1990 |
| JP | H06-235331 A | 8/1994 |
| JP | 2007500293 A | 1/2007 |
| WO | 2004016911 A1 | 2/2004 |
| WO | 2005012696 A1 | 2/2005 |
| WO | 2005116405 A1 | 12/2005 |
| WO | 2010123413 A1 | 10/2010 |

OTHER PUBLICATIONS

Japanese Office Action for Application No. JP 2014-548722 dated Nov. 11, 2015 (with English translation; 8 pages).

* cited by examiner

GAS TURBINE ENGINE COMPONENT

CROSS-REFERENCE TO RELATED APPLICATION

This application claims priority to, and is a National Phase of, International Application No. PCT/SE2011/000246, filed on Dec. 23, 2011, which is hereby incorporated by reference in its entirety.

TECHNICAL FIELD

This disclosure relates to a gas turbine engine component, for example, mechanical properties of a supporting structure comprising an outer ring structure, an inner ring structure and a plurality of circumferentially spaced radial elements for transferring loads between the inner ring structure and the outer ring structure.

BACKGROUND

An axial gas turbine engine, such as an aircraft "jet-engine," generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to, e.g., an aircraft.

Typically, the supporting structures are static parts that include an inner shell or ring, for connection to bearings and a centrally located drive shaft, and an outer shell or ring, for connection to, e.g., an engine casing, and where circumferentially distributed elements (struts, vanes) extend between and connect the inner and outer shells and/or rings. An axial gas flow through the engine is allowed to flow between the elements which normally are aerodynamically designed.

Generally, supporting structures need to be capable of transferring radial loads between the drive shaft and the engine casing as well as of withstanding an internal pressure. The particular demands depend on the application and a supporting structure is normally designed with focus on the most important capability. For instance, a supporting structure arranged in the compressor zone is subjected to a high internal pressure and needs normally to have a circular outer shape. Sufficiently massive structures of this type are also capable of transferring radial loads. However, the desire for low-weight products in air-craft applications has generated a need for supporting structures that are less heavy but that still are capable of transferring radial loads as well as of withstanding an internal pressure.

SUMMARY

The disclosure includes a supporting structure for a gas turbine engine that exhibits improved mechanical properties compared to conventional supporting structures.

A gas turbine engine component may comprise an outer ring structure, an inner ring structure and a plurality of circumferentially spaced radial elements for transferring loads between the inner ring structure and the outer ring structure, wherein the outer ring structure comprises a circular ring member for withstanding an internal pressure during operation of the gas turbine engine.

The outer ring structure may comprise a first set of circumferentially distributed and substantially straight reinforcement ribs for achieving radial stiffness, wherein the reinforcement ribs form sides in a polygonal shape and wherein each of said reinforcement ribs extends between two adjacent radial elements.

Such a design has the advantage that, whereas the circular wall is suitable for handling the load from the internal pressure, the added reinforcement ribs provides for a polygonal stiffening structure suitable for handling and distributing the radial forces transferred between the inner and outer ring structures, typically from a shaft bearing inside of the inner ring structure to engine mountings provided onto the outer ring structure. Each reinforcement rib forms a stiffening bridge between adjacent elements and together the reinforcement ribs form the polygonal stiffening structure. Due to these reinforcement ribs, it is not necessary that the circular wall is designed to withstand and handle the radial loads, only the internal pressure, and the circular wall can therefore be made thinner than in conventional structures. All together, the component can be made lighter than conventional components of similar type.

The reinforcement ribs may be arranged in such a way that a position of a corner of the polygonal shape formed by the reinforcement ribs substantially coincides with one of said elements or with a radial extension of one of the elements. This means that the each corner of the polygonal shape coincides circumferentially with an element somewhere along its radial length or outwards of the outer ring structure along a radial extension of the element.

The reinforcement ribs may be arranged radially inwards of the circular ring member. Although the ribs can be arranged outside or partly outside of the circular ring member this provides for a more robust structure and the component does not require any additional space outside of the circular ring member.

Each radial element may be connected to the inside of the circular ring member along an element connection zone, wherein the position of the corner of the polygonal shape formed by the reinforcement ribs substantially coincides with one of said element connection zones. This way the load can be effectively transferred between the reinforcement ribs and the radial elements.

The reinforcement ribs may be fixed to the circular ring member via a connecting member that extends between the reinforcement ribs and the circular ring member along at least a part of the length of the reinforcement ribs. This provides for a stiff arrangement of the ribs.

An end part of the reinforcement ribs may be bent radially towards the circular ring member. This is useful, for instance, when the end parts of ribs arranged at the inside of the circular ring member cannot be fastened directly to a radial element or to a connection zone where the element is fastened to the circular wall member, for instance because there is no suitable place for a welding joint at the radial element. Thus, the reinforcement ribs do not have to extend along the entire length of the sides of the polygonal shape, i.e., from corner to corner, to provide an advantageous function. However, the ribs should extend at least from the close vicinity of a radial element to the close vicinity of an adjacent radial element.

The outer ring structure may comprise a second set of reinforcement ribs arranged in the same way as the first set but displaced in an axial direction of the component. This enhances the load handling properties considerably without adding much weight since rather narrow reinforcement ribs can be used.

The outer ring structure may comprise a gas flow guiding ring member arranged radially inwards of the circular ring member, wherein the elements extend from the inner ring structure to the gas flow guiding ring member and from the gas flow guiding ring member further to the circular ring member. In such a structure the reinforcement ribs can be arranged between the gas flow guiding ring member and the circular ring member without interfering with the gas flow.

The disclosure includes a gas turbine engine comprising a component manufactured according to any of the above claims.

BRIEF DESCRIPTION OF DRAWINGS

In the description given below reference is made to the following figures, in which.

DESCRIPTION OF EXAMPLE EMBODIMENTS

Figure 1:
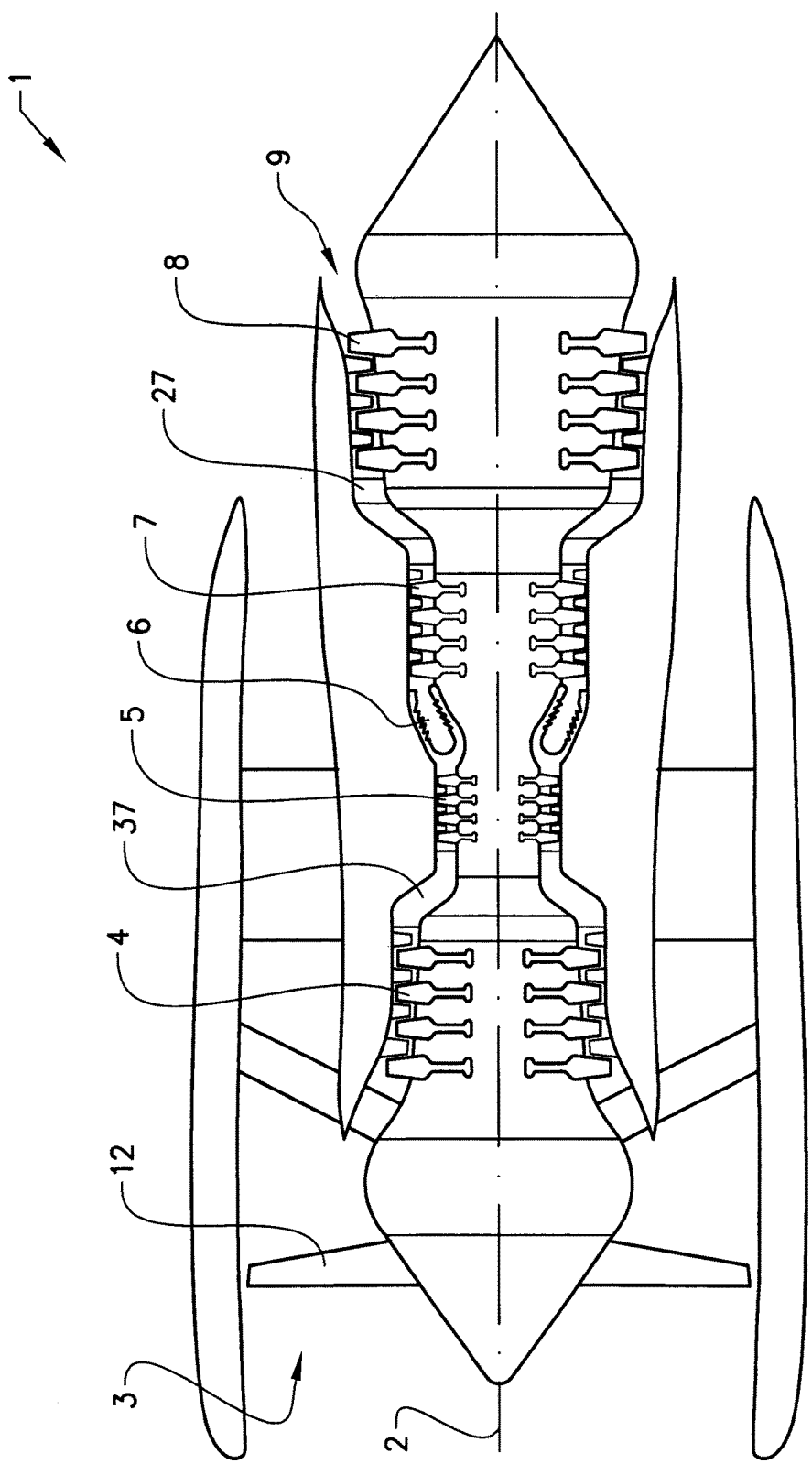
FIG. 1 shows, in a schematic overview, an axial flow aircraft gas turbine engine provided with a gas turbine engine component.

FIG. 1 shows, in a schematic overview, an axial flow aircraft gas turbine engine 1 provided with a supporting structure 37. FIG. 1 also shows a further supporting structure 27. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) turbine shaft (not shown). Similarly, the low pressure compressor 4 is driven by the low pressure turbine 8 via a second hollow shaft, the low pressure (LP) turbine shaft (not shown), which is coaxially disposed within the first turbine shaft 10. A third coaxially arranged shaft (not shown) is connected to a fan 12 that forces air into and around the gas turbine engine casing. A common axis 2 is also shown.

The gas turbine engine 1 operates, in general, in a conventional manner whereby air drawn in through the air intake 3 is initially compressed by the fan 12 and then compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The engine 1 further comprises a rear supporting structure 27 and a front supporting structure 37 for supporting the drive shafts and for mounting the engine to an aircraft. The front supporting structure 37 is arranged between the low and high pressure compressors 4, 5. A front supporting structure of a similar type is sometimes referred to as an intermediate compressor case, ICC. The rear supporting structure 27 is commonly referred to as a Turbine Rear Frame (TRF), Turbine Exhaust Case or Tail Bearing Housing.

Generally, support structures in jet engines support one or more shafts by use of roller bearings. A radial load is transmitted through an inner support structure (support cone) to an inner hub connected to an outer structure (shroud) by use of radial elements. In order to reduce aerodynamic drag or to straighten the outlet angle of the main gas flow, these elements are usually covered with an airfoil structure or made integral to the structure. Integrated airfoils or vanes are sometimes denoted "struts." In the example described below the term structural vanes is used. Structural vanes are capable of supporting both aerodynamic loads as well as a combination of structural and thermally induced loads. Most of the modern jet engines utilize such vanes in ring-vane-ring components, such as the supporting structure 37.

Figure 2:
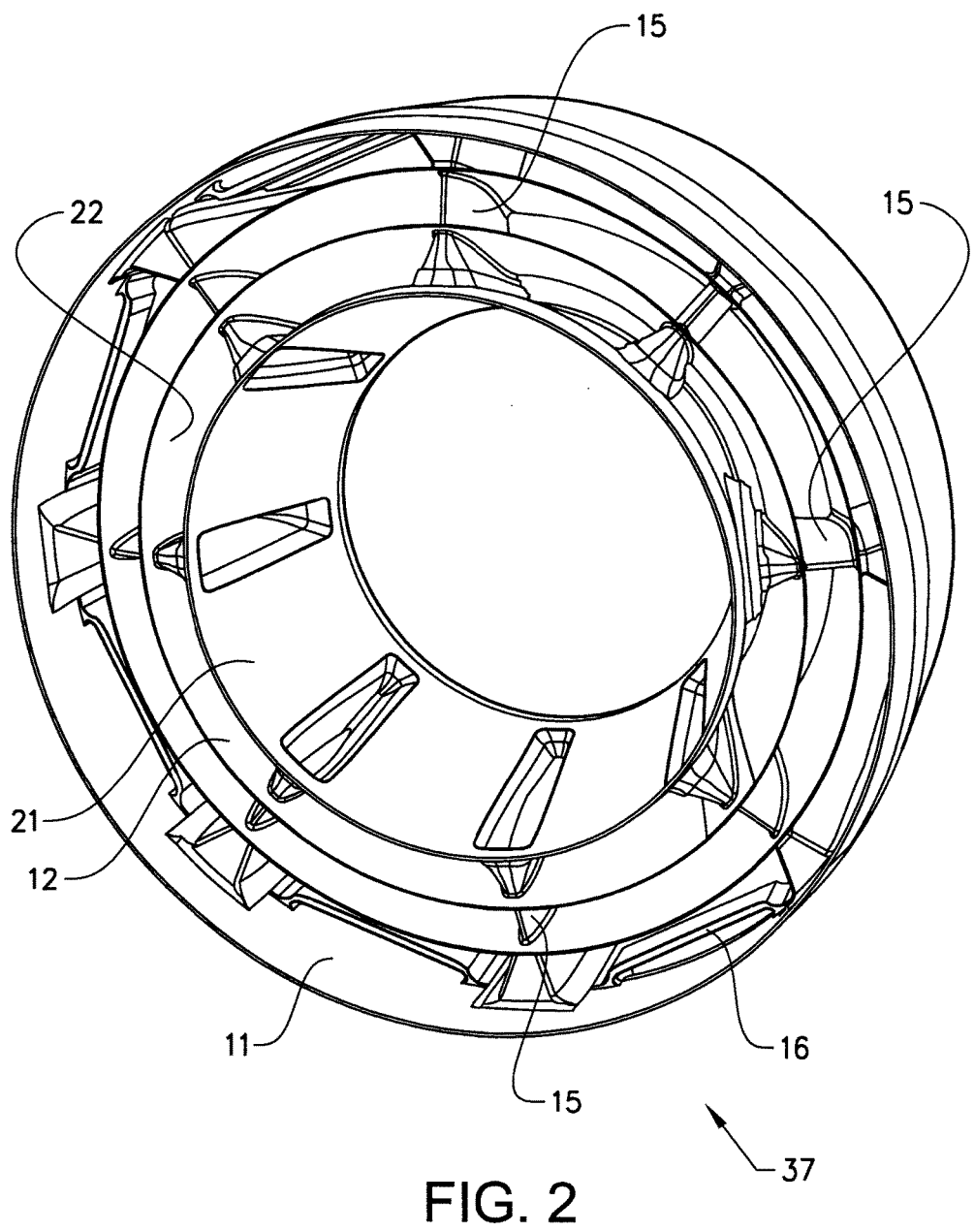
FIG. 2 shows, in a perspective front view, an embodiment of the gas turbine engine component.
Figure 3:
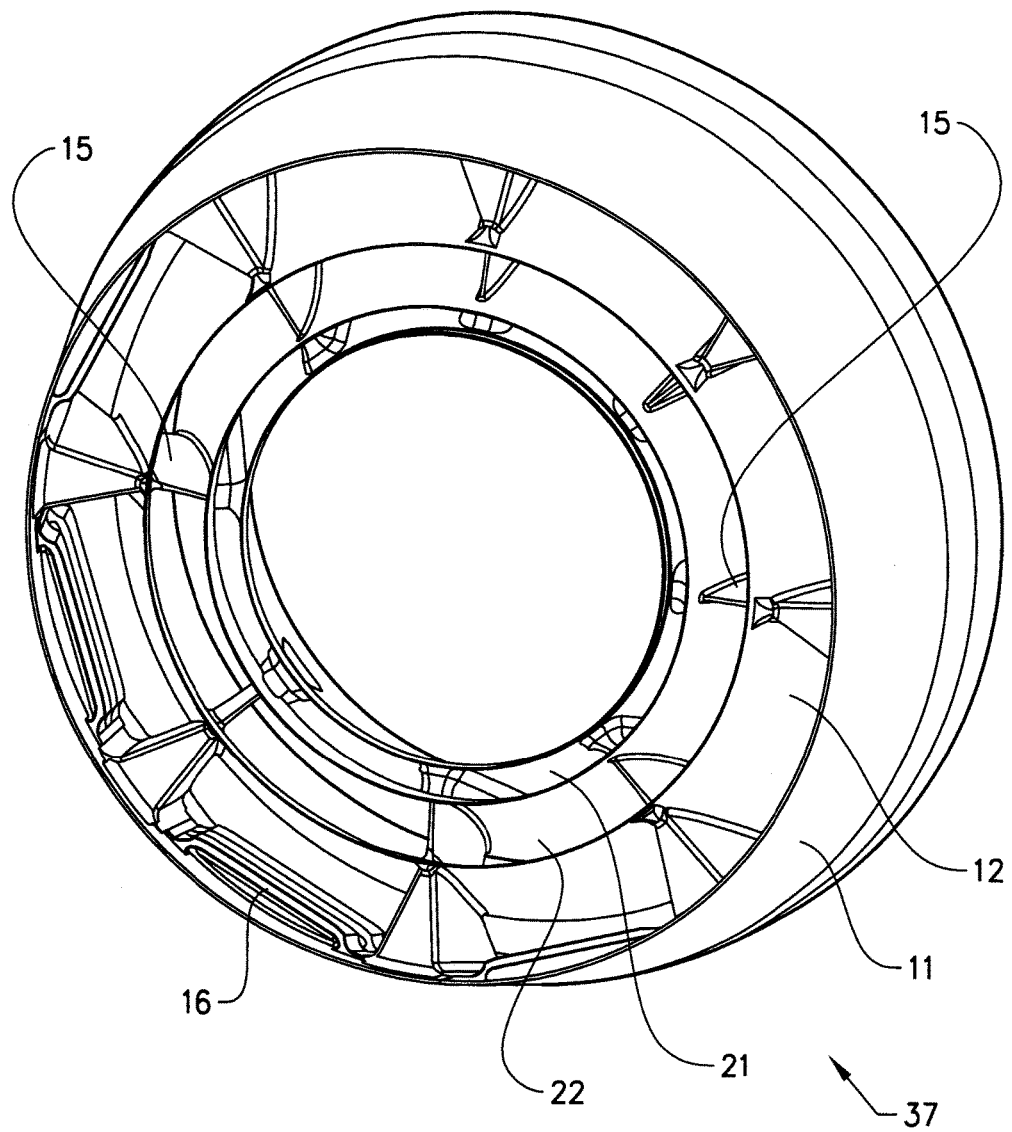
FIG. 3 shows, in a perspective rear view, the embodiment according to FIG. 2.
Figure 4:
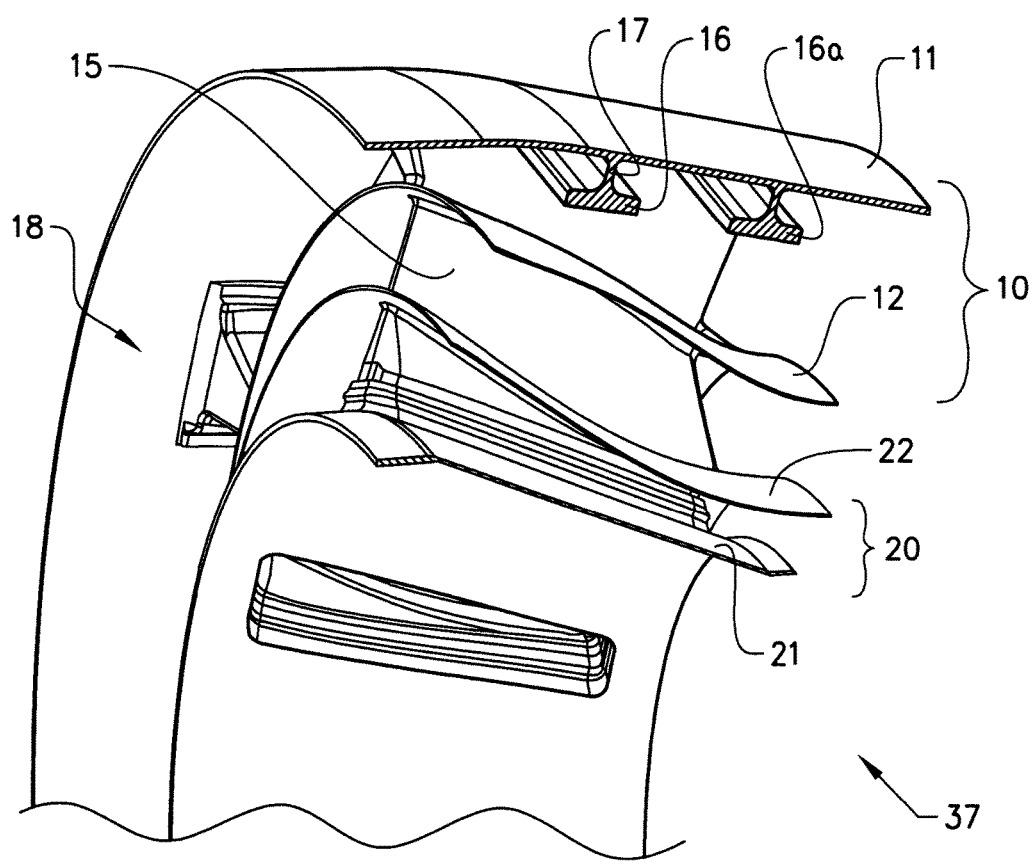
FIG. 4 shows a first perspective sectional view of the embodiment according to FIGS. 2.
Figure 5:
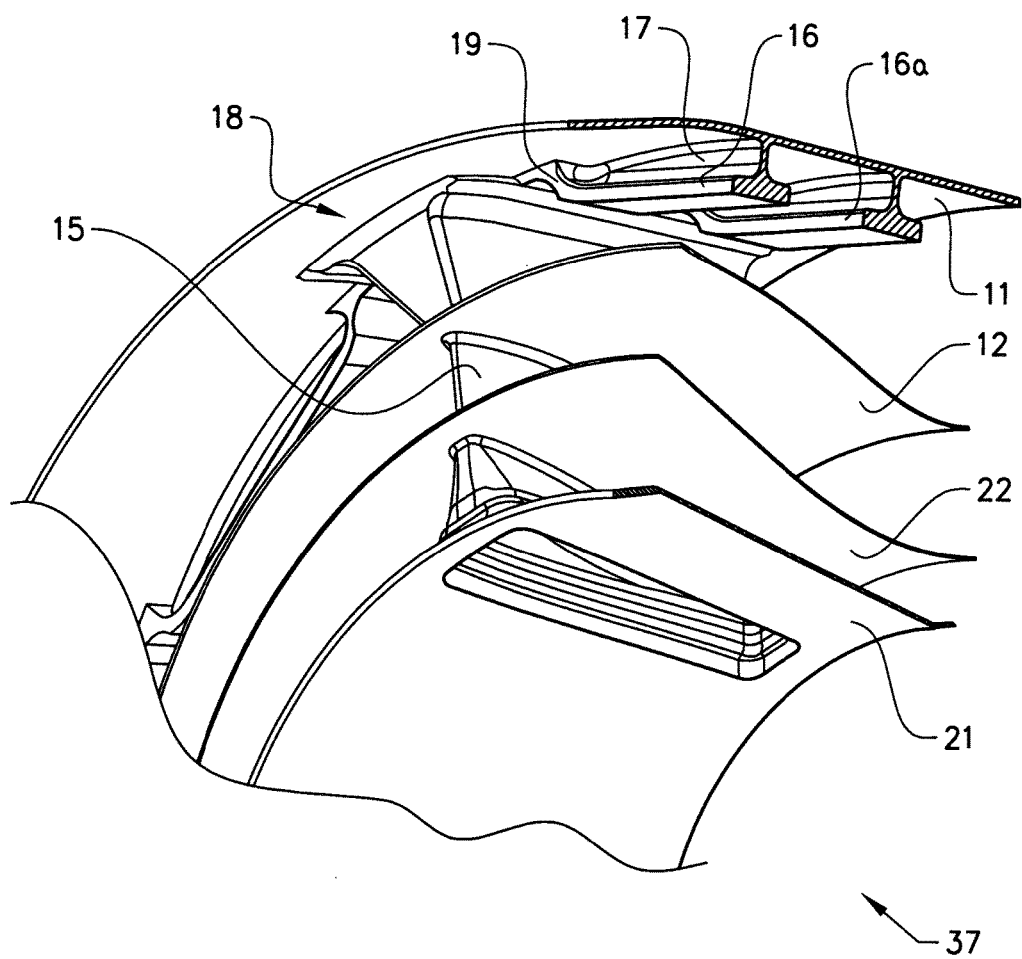
FIG. 5 shows a second perspective sectional view of the embodiment according to FIG. 2.

FIGS. 2 and 3 show perspective front and rear views, respectively, of an embodiment of the component and FIGS. 4-5 show different perspectives of a sectional view of the same embodiment.

In FIGS. 2-5 it is shown a gas turbine engine component 37 comprising an outer ring structure 10 (FIG. 4), an inner ring structure 20 (FIG. 4) and a plurality of circumferentially spaced radial elements in the form of structural vanes 15 for transferring loads between the inner and outer ring structures 10, 20.

The outer ring structure 10 comprises an outer circular ring member 11 for withstanding an internal pressure during operation of the gas turbine engine 1, and a gas flow guiding ring member 12 arranged radially inwards of the circular ring member 11.

The inner ring structure 20 comprises a hub member 21 and an inner gas flow guiding ring member 22 arranged radially outwards of the hub member 21. An annular load transfer structure (not shown) is arranged on an inside of the hub member 21 for transferring loads between the radial elements 15 and a bearing structure for a turbine shaft positioned centrally in the component 37.

The radial elements extend from the hub member 21 to the circular ring member 11 via (or through) the two gas flow guiding ring members 22, 12 and from the gas flow guiding ring member further.

A primary gas channel for axial gas flow is defined between the two gas flow guiding ring members 12, 22 and between the elements 15, wherein the component 37 has an inlet side for gas entrance and an outlet side for gas outflow. The radial elements 15 have an airfoil shape only along the portion extending between the two gas flow guiding ring members 12, 22.

The outer ring structure 10 comprises a plurality of circumferentially distributed and substantially straight reinforcement ribs 16 arranged on an inside of the circular ring member 11 to provide radial stiffness of the component 37. As can best be seen in FIG. 2, the reinforcement ribs 16 form sides, or at least part of sides, in a polygonal shape wherein each of the reinforcement ribs 16 extends between two adjacent radial elements 15. In other words, the reinforcement ribs 16 as projected onto a plane perpendicular to the axial direction of the component 37 form the sides, or at least part of sides, of a polygonal form.

Each radial element 15 is connected to the inside of the circular ring member 11 at an element connection zone 18 (see FIGS. 4-5) and the reinforcement ribs 16 are arranged in such a way that a position of a corner of the polygonal shape formed by the reinforcement ribs 16 substantially coincides with one of these element connection zones 18. In other words, imaginary extensions of the straight part of two adjacent reinforcement ribs 16 crosses each other in a position substantially corresponding with the connection zone 18 of one of the radial elements 15.

As shown in FIGS. 4-5 the reinforcement ribs 16 are fixed to the inside of the circular ring member 11 via a connecting member 17 that extends between the reinforcement ribs 16 and the inside of the circular ring member 11.

Both the reinforcement ribs 16 and the connecting member 17 exhibit in this case a rectangular cross section. The reinforcement ribs 16 are arranged with their widest side facing in a radial direction and the connecting member 17 is arranged perpendicular to the reinforcement ribs 16 such as to form a T-shaped cross section, see FIG. 4.

In this example, an end part 19 (FIG. 5) of the reinforcement ribs 16 is bent radially outwards towards the inside of the circular ring member 11 at a short distance from the radial element 15 in its connection zone 18. In principle, the stiffness effect provided by the reinforcement ribs 16 would be further enhanced if the ribs 16 had extended all the way to the connection zone 18. However, due to difficulties in this example to fasten the ribs 16 by welding closer to the element 15 the reinforcement ribs 16 are terminated a small distance from the element 15.

As can be seen in FIGS. 4-5, the outer ring structure 10 comprises a second set of reinforcement ribs 16a arranged in the same way as the ribs 16 described above but the second set of ribs 16a is displaced in an axial direction of the component (downstream).

Reinforcement ribs 16 of the above type are of interest both for prefabricated components formed by joining a number of different parts together as well as for components produced by casting.

The disclosure is not limited by the embodiments described above but can be modified in various ways within the scope of the claims. For instance, the reinforcement ribs 16 may very well extend a bit further as to more, or even fully, resemble a polygonal shape. Moreover, the reinforcement ribs 16 do not necessarily have to be fastened to the outer circular ring member 11 and might also fully or partly be arranged outside of the circular ring member 11. Further, the number of axially displaced sets of reinforcement ribs 16 may be varied depending on the application.

If the ribs 16 are arranged (partly) outside of the circular ring member 11, the ribs 16 may be arranged so that each corner of the polygonal shape coincides with a radial extension of one of the elements 15.

Further, the disclosure is not limited to the type of supporting structure 37 exemplified above. It is also applicable to other supporting structures in a gas turbine engine such as a front frame (inlet frame or fan hub frame), an intermediate case (IMC), a turbine mid structure (TMF, TMS) or a turbine rear frame (TRF). Further, the disclosure is applicable to stationary gas turbines (power generators) as well as to flying jet engines.

The invention claimed is:

1. A component for a gas turbine engine, the component comprising:
    an outer ring structure, an inner ring structure, and a plurality of circumferentially spaced radial elements for transferring loads between the inner ring structure and the outer ring structure, wherein the outer ring structure comprises a circular ring member for withstanding an internal pressure during operation of the gas turbine engine;
    wherein the outer ring structure comprises a first set of circumferentially distributed and substantially straight reinforcement ribs for achieving radial stiffness, wherein the reinforcement ribs form sides in a polygonal shape and wherein each of said reinforcement ribs extends between two adjacent radial elements; and
    wherein the reinforcement ribs are arranged radially inwards of the circular ring member.

2. A component according to claim 1, wherein the reinforcement ribs are arranged so that a position of a corner of the polygonal shape formed by the reinforcement ribs substantially coincides with one of said radial elements or with a radial extension of one of the radial elements.

3. A component according to claim 2, wherein each radial element is connected to an inside of the circular ring member along an element connection zone, wherein the position of the corner of the polygonal shape formed by the reinforcement ribs substantially coincides with one of said element connection zones.

4. A component according to claim 1, wherein the reinforcement ribs are fixed to the circular ring member via a connecting member that extends between the reinforcement ribs and the circular ring member along at least a part of the length of the reinforcement ribs.

5. A component according to claim 1, wherein an end part of the reinforcement ribs is bent radially towards the circular ring member.

6. A component according to claim 1, wherein the outer ring structure comprises a second set of reinforcement ribs displaced in an axial direction of the component.

7. A component according to claim 1, wherein a primary gas channel for axial gas flow is defined between the inner and outer ring structures and between the radial elements, and wherein the component has an inlet side for gas entrance and an outlet side for gas outflow.

8. A component according to claim 1, wherein the outer ring structure comprises a gas flow guiding ring member arranged radially inwards of the circular ring member, wherein the radial elements extend from the inner ring structure to the gas flow guiding ring member and from the gas flow guiding ring member further to the circular ring member.

9. A component according to claim 1, further comprising a load transfer structure arranged inside of the inner ring structure for transferring loads between said radial elements and a bearing structure for a turbine shaft positioned centrally in the component.

10. A component according to claim 1, wherein the reinforcement ribs as projected onto a plane perpendicular to the axial direction of the component form sides of a polygonal form.

11. A gas turbine engine comprising:
    a component including an outer ring structure, an inner ring structure, and a plurality of circumferentially spaced radial elements for transferring loads between the inner ring structure and the outer ring structure, wherein the outer ring structure comprises a circular ring member for withstanding an internal pressure during operation of the gas turbine engine;
    wherein the outer ring structure comprises a first set of circumferentially distributed and substantially straight reinforcement ribs for achieving radial stiffness, wherein the reinforcement ribs form sides in a polygonal shape and wherein each of said reinforcement ribs extends between two adjacent radial elements; and
    wherein the reinforcement ribs are arranged radially inwards of the circular ring member.

12. A gas turbine engine according to claim 11, wherein the gas turbine engine is arranged for propulsion of an aircraft.

13. A component according to claim 11, wherein the reinforcement ribs are arranged so that a position of a corner of the polygonal shape formed by the reinforcement ribs substantially coincides with one of said radial elements or with a radial extension of one of the radial elements.

14. A component according to claim 13, wherein each radial element is connected to an inside of the circular ring member along an element connection zone, wherein the position of the corner of the polygonal shape formed by the reinforcement ribs substantially coincides with one of said element connection zones.

15. A component according to claim 11, wherein the reinforcement ribs are fixed to the circular ring member via a connecting member that extends between the reinforcement ribs and the circular ring member along at least a part of the length of the reinforcement ribs.

16. A component according to claim 11, wherein an end part of the reinforcement ribs is bent radially towards the circular ring member.

17. A component according to claim 11, wherein the outer ring structure comprises a second set of reinforcement ribs displaced in an axial direction of the component.

18. A component according to claim 11, wherein a primary gas channel for axial gas flow is defined between the inner and outer ring structures and between the radial elements, and wherein the component has an inlet side for gas entrance and an outlet side for gas outflow.

19. A component according to claim 11, wherein the outer ring structure comprises a gas flow guiding ring member arranged radially inwards of the circular ring member, wherein the radial elements extend from the inner ring structure to the gas flow guiding ring member and from the gas flow guiding ring member further to the circular ring member.

20. A component according to claim 11, further comprising a load transfer structure arranged inside of the inner ring structure for transferring loads between said radial elements and a bearing structure for a turbine shaft positioned centrally in the component.

21. A component according to claim 11, wherein the reinforcement ribs as projected onto a plane perpendicular to the axial direction of the component form sides of a polygonal form.

* * * * *